Patented Apr. 15, 1941

2,238,685

UNITED STATES PATENT OFFICE 2,238,685

COMPLEX RESIN COATING COMPOSITION AND PROCESS OF MAKING SAME

Carleton Ellis, Montclair, N. J., assignor to Ellis-Foster Company, a corporation of New Jersey No Drawing. Application August 9, 1938, Serial No. 223,799

3 Claims. (Cl. 260—9)

This invention relates to resinous compositions adapted for use in coating compositions and particularly to resin complexes comprising condensed saccharide-urea-formaldehyde condensation products and alkyd resins. An object of the invention is to provide light-colored soluble resinous products whose solutions dry to form hard films. Another object is to produce such compositions at a relatively low cost. Other objects will be apparent from the description which follows.

It is known to prepare sugar-modified urea-formaldehyde products in various ways such as by incorporating sugars with a urea-formaldehyde reaction product, by reacting urea with a sugar-formaldehyde compound, or by reacting a mixture consisting of a sugar, urea and formaldehyde. Such products are relatively sensitive to water and do not appear to possess solubility in organic solvents to a degree sufficient to form lacquers, or solutions in organic solvents which can be blended with other film-forming materials.

According to the present invention urea, a saccharide and formaldehyde are reacted in substantially neutral aqueous medium to yield a syrupy reaction solution. If the reaction mixture is dehydrated, the product is soluble in water but insoluble in organic solvents. It has been found, however, and this is a feature of the present invention, that if an alkyd resin is added before or during the dehydration, the product obtained is insoluble in water but soluble in organic solvents such as alcohols, glycol ethers or mixtures of such liquids with ketones, esters and hydrocarbons. Organic liquid solubility and the fact that water does not extract the ordinarily hydrophilic urea product, indicate a reaction complex. It is advantageous to add the alkyd resin as a solution in an organic solvent and heat the mixture. If added before dehydration and if the solvent is of higher boiling point than water, the mixture is distilled until all water is eliminated and a resin solution obtained. This solution can be used directly as a lacquer or it can be mixed with compatible film-forming substances. The resin is compatible with nitrocellulose and is useful as an adjunct to such lacquers.

The process consists in preparing a saccharide-urea-formaldehyde condensation product and incorporating therewith an alkyd resin. The term saccharide as used herein is intended to include the water-soluble mono- and disaccharides or sugars such as glucose, fructose, maltose, sucrose, lactose and mixtures thereof, and not the water-insoluble polysaccharides such as starch and cellulose. Preferably the sugar is first reacted with an excess of formaldehyde and this product combined with urea, after which the alkyd resin is introduced. The reaction mixture is made neutral with an alkali. A darker colored product results when the saccharide, formaldehyde, urea and alkyd resin are reacted in one step. The proportion of formaldehyde to urea is more than 2 moles to 1 mole of urea. Thiourea or mixtures of urea and thiourea can also be used. The proportion of alkyd resin to sugar-urea-formaldehyde ranges from about 25% upwards based on total complex.

The alkyd resins utilized herein are preferably those obtained from olefin-dicarboxylic acids such as maleic, fumaric, citraconic and itaconic (or their anhydrides where available), such acids being combined with polyhydric alcohols (for example, glycerol, glycols, mannitol, methyl glycerol, etc.) and also if desired with monobasic acids such as abietic acid or acids derived from fatty oils. Maleic alkyd resins appear to yield more water-resistant films and to be more compatible with the sugar-urea-formaldehyde products than alkyd resins utilizing polycarboxylic acids such as phthalic. Also the baked films are somewhat harder when an alkyd resin composed of an acid of the maleic type is used.

*Example 1.*—200 parts of cane sugar (sucrose) and 200 parts of 37.8% aqueous formaldehyde were heated slowly together up to 100° C. The reaction was accompanied by foaming and when this foaming had partially subsided the temperature was raised slowly to 140° C. during about 3 hours to remove the water. A clear, water-white product resulted which was hard and brittle at room temperature.

20 parts of this product and 38 parts of 37.8% neutralized aqueous formaldehyde were refluxed together for about 10 minutes. 14.3 parts of urea dissolved in an equal amount of water were added. The solution was neutralized with 5% aqueous sodium hydroxide, and refluxing was continued for about 30 minutes. 40 parts of glycerol maleate, prepared by heating equivalent amounts of glycerol and maleic anhydride together at 190–200° C. until the acid number of the resulting resin was 241, dissolved in 80 parts of butanol, were added to the refluxing mixture and refluxing continued for an additional 5 minutes. The solution was dehydrated under reduced pressure at 80° C. until a pale yellow, clear lacquer was obtained. A film of this lacquer when baked in an oven for 1 hour at 120° C. was clear and hard.

The above example indicates a preferred process. When the alkyd resin is added at the start, a darker colored product results as shown below.

*Example 2.*—40 parts of glycerol maleate resin of Example 1, 20 parts of cane sugar, and 75.6 parts of aqueous 37.8% formaldehyde were refluxed together for about 3 hours, during which time the mixture darkened considerably. 14.3 parts of urea dissolved in water were added, and refluxing continued for about 30 minutes. The solution was dehydrated under reduced pressure at 80° C. until substantially all of the water had been removed. 80 parts of butanol were added and heating continued until a deep yellow, clear lacquer containing 50% solids was obtained. A film of this lacquer when heated in an oven for 1 hour at 120° C. was clear and hard.

*Example 3.*—12.5 parts of the sugar-formaldehyde product of Example 1 and 24.1 parts 37.8% neutralized aqueous formaldehyde were refluxed together for about 10 minutes, then 9 parts of urea dissolved in water were added, the solution neutralized with 5% aqueous sodium hydroxide, and refluxing continued for about 30 minutes. 75 parts of glycerol maleate resin of Example 1, dissolved in 100 parts of butanol, were added to the refluxing mixture and refluxing continued for an additional 5 minutes. The solution was dehydrated under reduced pressure at 80° C. until a pale yellow, clear lacquer containing 50% solids was obtained. A film of this lacquer when baked in an oven for 1 hour at 120° C. was clear and hard.

*Example 4.*—37.5 parts of the sugar-formaldehyde product of Example 1 and 72 parts of 37.8% neutralized aqueous formaldehyde were refluxed together for a few minutes, then 27 parts of urea dissolved in water were added, the solution neutralized with 5% aqueous sodium hydroxide, and refluxing continued for about 30 minutes. 25 parts of glycerol maleate resin of Example 1, dissolved in 100 parts of butanol, were added to the refluxing mixture and refluxing continued for an additional 5 minutes. The solution was dehydrated under reduced pressure at 80° C. until a pale yellow, clear lacquer containing 50% solids was obtained. A film of this lacquer when baked in an oven for 1 hour at 120° C. was clear and hard.

In making the resins of this invention it is not necessary first to prepare the saccharide-formaldehyde product free from water. Instead, the product in aqueous reaction solution may be treated with urea under substantially neutral conditions as shown below.

*Example 5.*—40 parts of glucose and 191.2 parts of 37.8% neutralized aqueous formaldehyde were refluxed together for about 3 hours, then 26.3 parts of urea dissolved in water were added and refluxing continued for about 30 minutes. The solution was dehydrated under reduced pressure at 80° C. until substantially all of the water had been removed. 80 parts of glycerol maleate resin of Example 1 dissolved in 160 parts of butanol were added and heating continued until a pale amber-colored, clear lacquer containing 50% solids was obtained. A film of this lacquer when heated in an oven for 1 hour at 120° C. was clear and hard.

*Example 6.*—40 parts of lactose and 191.2 parts of 37.8% neutralized aqueous formaldehyde were refluxed together for about 3 hours, then 26.3 parts of urea dissolved in water were added and refluxing continued for about 30 minutes. The solution was dehydrated under reduced pressure at 80° C. until substantially all of the water had been removed. 80 parts of glycerol maleate resin of Example 1 dissolved in 160 parts of butanol were added and heating continued until a pale amber colored, clear lacquer containing 50% solids was obtained. A film of this lacquer when baked in an oven for 1 hour at 120° C. was clear and hard.

The above examples illustrate the use of glycerol maleate. Other alkyds can be utilized. However, it has been found that those involving a polycarboxylic acid of the maleic type yield harder films than those in which phthalic is used. Various alkyds are shown below.

*Example 7.*—25 parts of sugar-formaldehyde product of Example 1 and 47.1 parts of neutralized aqueous 37.8% formaldehyde were refluxed together for a few minutes, then 17.8 parts of urea dissolved in water were added, the solution neutralized with 5% aqueous sodium hydroxide, and refluxing continued for about 30 minutes. 50 parts glycerol phthalate, prepared by heating equivalent amounts of glycerol and phthalic anhydride together at 190–200° C. until the acid number of the resulting resin was 248, dissolved in 100 parts of butanol were added to the refluxing mixture and refluxing continued for an additional 5 minutes. The solution was dehydrated under reduced pressure at 80° C. until a yellow, clear lacquer containing 50% solids was obtained. A film of the lacquer when baked in an oven for 1 hour at 120° C. was clear, though not as hard as the film of Example 1.

*Example 8.*—25 parts of the sugar-formaldehyde product of Example 1 and 47.1 parts of 37.8% neutralized aqueous formaldehyde were refluxed together for 5 to 10 minutes, then 17.8 parts of urea dissolved in water were added, the solution neutralized with 5% aqueous sodium hydroxide, and refluxing continued for about 30 minutes. 50 parts of diethylene glycol phthalate, prepared by heating equimolecular amounts of diethylene glycol and phthalic anhydride at 200–210° C. until the acid number of the resulting resin was 66, dissolved in 100 parts of butanol were added to the refluxing mixture and refluxing continued for an additional 5 minutes. The solution was dehydrated under reduced pressure at 80° C. until a pale yellow, clear lacquer containing 50% solids was obtained. A film of this lacquer when baked in an oven for 1 hour at 120° C. was clear and hard.

*Example 9.*—25 parts of the sugar-formaldehyde product of Example 1 and 47.1 parts of 37.8% neutralized aqueous formaldehyde were refluxed together for 5 to 10 minutes, then 17.8 parts of urea dissolved in water were added, the solution neutralized with 5% aqueous sodium hydroxide, and refluxing continued for about 30 minutes. 50 parts of diethylene glycol maleate, prepared by heating equimolecular weights of diethylene glycol and maleic anhydride together at 200–210° C. until the acid number of the resulting resin was 74.5, dissolved in 100 parts of butanol, were added to the refluxing mixture and refluxing continued for an additional 5 minutes. The solution was dehydrated under reduced pressure at 80° C. until a light yellow, clear lacquer was obtained. A film of this lacquer when baked in an oven for 1 hour at 120° C. was clear and very hard.

*Example 10.*—25 parts of the sugar-formaldehyde product of Example 1 and 47.1 parts of 37.8% neutralized aqueous formaldehyde were refluxed together for about 10 minutes, then 17.8 parts of urea dissolved in water were added, the solution neutralized with 5% aqueous sodium hydroxide, and refluxing continued for about 30 minutes. 50 parts of a monobasic acid-modified alkyd resin such as that sold under the name Rezyl 12, dissolved in 100 parts of butanol, were added to the refluxing mixture and refluxing continued for an additional 5 minutes. The solution was dehydrated under reduced pressure until an orange yellow, clear lacquer containing about 50% solids was obtained. A film of this lacquer when baked in an oven for 1 hour at 120° C. was clear and hard.

*Example 11.*—25 parts of the sugar-formaldehyde product of Example 1, and 47.1 parts of 37.8% neutralized aqueous formaldehyde were refluxed together for a few minutes, then 17.8 parts of urea dissolved in water were added, the solution neutralized with 5% aqueous sodium hydroxide, and refluxing continued for about 30 minutes. 50 parts of a drying oil acid-modified phthalic glyceride known as Rezyl 110, dissolved in 100 parts of butanol, were added to the refluxing mixture and refluxing continued for an additional 5 minutes. The solution was dehydrated under reduced pressure at 80° C. until an orange, clear lacquer containing 50% solids was obtained. A film of this lacquer when baked in an oven for 1 hour at 120° C. was clear and hard.

*Example 12.*—25 parts of the sugar-formaldehyde product of Example 1, and 47.1 parts of 37.8% neutralized aqueous formaldehyde were refluxed together for a few minutes, then 17.8 parts of urea dissolved in water were added, the solution neutralized with 5% aqueous sodium hydroxide, and refluxing continued for about 30 minutes. 50 parts of alpha-methyl-glycerol maleate, prepared by heating a mixture of equivalent amounts of methyl-glycerol and maleic anhydride at 190–200° C. until the acid number of the resulting resin was 228, dissolved in 100 parts of butanol, were added to the refluxing mixture and refluxing continued for an additional 5 minutes. The mixture was concentrated by heating under reduced pressure until a very light yellow, clear solution containing 50% solids was obtained. A baked film of this lacquer was clear, hard, and very tough.

What I claim is:

1. A resin complex soluble in organic solvents comprising a neutralized saccharide-urea-formaldehyde resin and a polyhydric alcohol-polycarboxylic acid reaction product condensed therewith in butanol solution.

2. Process of making a saccharide-urea-formaldehyde-alkyd resinous composition which comprises reacting a saccharide, formaldehyde and urea in neutral aqueous medium, incorporating a butanol solution of an alkyd resin therewith in proportion sufficient to impart organic solvent solubility to the final product, and removing water therefrom.

3. A synthetic resinous composition substantially identical with the product made by the process of claim 2.

CARLETON ELLIS.